United States Patent Office 3,541,205
Patented Nov. 17, 1970

3,541,205
WASH RESISTANT LOTION CONTAINING ORGANOSILICON RESINS
William D. Hardigan and Leo F. Stebleton, Midland, Mich., assignors to Dow Corning Corporation, Midland, Mich., a corporation of Michigan
No Drawing. Continuation-in-part of application Ser. No. 481,105, Aug. 19, 1965. This application Apr. 11, 1966, Ser. No. 541,536
Int. Cl. A61k 9/06; A61l 23/00
U.S. Cl. 424—60   10 Claims

ABSTRACT OF THE DISCLOSURE

Organosilicon skin preparations containing two incompatible organosiloxane fluids that resist removal from the skin by washing. As a result, they are useful as hand lotions or ointments for dentists and for others who are required to wash their hands frequently. Illustrative of such a preparation is a dispersion of 2 percent by weight

fluid, 2 percent by weight dimethylsiloxane fluid and 96 percent by weight 1,1,1-trichloroethane. Optionally the skin preparation can also contain an organosilicon resin such as a copolymer of $SiO_2$ units and $(CH_3)_3SiO_{1/2}$ units.

---

This application which is continuation-in-part of U.S. application Ser. No. 481,105, filed Aug. 19, 1965, now abandoned, relates to skin preparations that resist removal from the skin by washing. They are useful as hand lotions or ointments for dentists and for others who are required to wash their hands frequently, or are otherwise subjected to frequent wet conditions. They are particularly helpful for those whose skin becomes inflamed as a reaction to the repeated washing or wetting, as the preparations of this invention lay a protective, soothing coating on the skin of the hands or wherever it is applied. The preparations of this invention have the further advantage of being generally nontacky to the touch.

The skin preparations of this invention can be ointments, or emulsions, dispersions, or solutions in an appropriate volatile solvent.

The wash-resistant characteristic of the compositions of this invention can be utilized to bring a medicament into contact with the skin for an extended period of time without the need for reapplication after washing.

The skin preparation of this invention consists essentially of a mixture of (a) 100 parts by weight of a fluid organopolysiloxane consisting essentially of $(R_2SiO)$ units, which has a viscosity of at least 20 cs. at 25° C.,
(b) from 10 to 100 parts by weight of a fluid organopolysiloxane consisting essentially of $(R_2SiO)$ units, which has a viscosity of at least 20 cs. at 25° C. and which is incompatible with (a), where R is selected from the group consisting of 3,3,3,-trifluoropropyl, phenyl, and alkyl radicals, the viscosity at 25° C. of at least one of (a) and (b) being no more than 400 cs.,
(c) from 0 to 100 parts by weight of an organosilicon resin consisting essentially of

units, where R is defined above and $n$ has an average value of 1.0 to 1.8, a total of at least 30 parts of (b) and (c) being present, and
(d) from 0 to 100 parts of a medicament.

This mixture is preferably dispersed in a volatile, nontoxic dispersing agent. The amount of dispersing agent is not critical, but the amount added will usually be between 500 and 8,000 parts, based on the total parts of (a), (b), and (c) present.

Examples of the alkyl radicals that are represented by R are methyl, ethyl, isopropyl, 2-ethylhexyl, hexadecyl, and myricyl.

Ingredients (a) and (b) must be incompatible, by which is meant that one part by weight of either of the two ingredients will not be miscible in ten parts by weight of the other ingredient to form a single phase without the presence of a common solvent for both ingredients.

Examples of incompatible ingredients (a) and (b) are (a) 3,3,3-trifluoropropylmethylpolysiloxane and (b) dimethylpolysiloxane or a copolymer of dimethylpolysiloxane and phenylmethylsiloxane; (a) 3,3,3-trifluoropropylmethylpolysiloxane and (b) a copolymer of dimethylsiloxane and diphenylsiloxane; or (a) phenylmethylpolysiloxane or hexylmethylpolysiloxane and (b) dimethylpolysiloxane. The presence of both (a) and (b) tends to eliminate the tackiness of the lotion, so it is preferred for at least 20 parts of (b) to be present.

Ingredient (c), the organosilicone resin, greatly improves the wash-resistance of the lotion of this invention. It is therefore desirable for at least 20 parts by weight of ingredient (c) to be present, based on the above formulation. Wash-resistance is also obtained when either ingredient (a) or (b) has a viscosity of over 1,000 cs. at 25° C.

It is preferred for both of ingredients (a) and (b) to have a viscosity of over 100 cs. at 25° C.

Examples of ingredient (c) are polymers of the average unit formulae

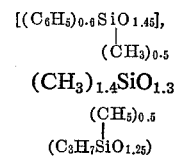

or

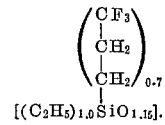

Ingredients (a), (b) and (c) can also contain extraneous groups in small amounts besides the polymer units defined above. Examples of these are the silicon-bonded hydroxyl group, the silicon-bonded methoxy or ethoxy groups, and endblocking siloxanes such as trimethylsiloxane.

If desired, an ingredient (c) which contains some of the above-mentioned extraneous alkoxy groups or hydroxyl groups can be reacted with all or part of either ingredient (a) or (b) which contains silicon-bonded hydroxyl or alkoxy groups by heating them together at about 100–200° C., preferably in a vacuum, in order to remove the water and alcohol formed through the condensation of the above hydroxyl and alkoxy groups. The resulting product will be a cocondensate of increased viscosity. The cocondensate can then be combined with the other ingredient or ingredients to form the lotion of this invention.

Ingredient (d) can be any known medicament for the skin, e.g., astringents such as aluminum chloride or calamine; irritants, rubefacients, and vesicants such as Coal Tar, U.S.P. or menthol; caustic and escharotic agents such as Podophyllum, U.S.P.; keratolytic agents such as salicylic acid; hormones or their synthetic analogues such as Dexamethasone N.F., Hydrocortisone U.S.P., or Prednisolone, U.S.P.; local anesthetics such as Benzocaine N.F.; antihistaminics such as Tripelennamine H.A.; antimicrobial agents such as Cetylpyridinium Chloride, N.F. or Iodine, U.S.P.; fungicides such as ammoniated mercury; sulfa drugs such as Sulfacetamide, N.F.; antibiotics such as Bacitracin, U.S.P.; parasiticides such as Gamma Benzene Hexachloride, U.S.P.; vitamins and nutrients such as vitamin A; sun-screening agents such as glycerol p-aminobenzoate; or combinations of the above and other medicaments.

Many of the above medicaments are, of course, usable only under the supervision of a physician. Also the maximum amount of each medicament which is used herein is not critical for the purposes of this invention, but is subject to the usual regulations for the use of such drugs on skin.

Applicants do not claim to have invented a new drug or any new uses of an old drug. The invention of this application relates only to a system which can be used as a carrier for known medicaments which prevents them from being easily washed from the skin, thereby reducing the need for frequent application or reduced activity on the part of the user.

If desired, ingredients (a), (b), and (c) can each be mixtures of various organosilicon compounds, e.g., a mixture of dimethylpolysiloxane with a phenylmethyldimethylsiloxane copolymer.

The above ingredients can be mixed by adding a volatile, nontoxic dispersing agent, which can be a solvent for the above ingredients present or which can be a nonsolvent. Examples of such dispersing agents are water, 1,1,1-trichloroethane, trifluorotrichloroethane, isobutanol, acetone, ethyl acetate, amyl acetate, cyclopentane, diethylether, chloroform, and mixtures of the above.

The preparation is often used as a dilute dispersion in a volatile, nontoxic dispersing agent, since it is easily applied to the skin in that form, and it is preferable for small amounts of lotion to be applied, merely enough for a thin film of lotion to form on the skin.

It is preferred for one of ingredients (a) or (b) to be an organopolysiloxane of the unit formula

while the other of the above two ingredients is preferably dimethylpolysiloxane, a copolymer of dimethylsiloxane and phenylmethylsiloxane units, or a mixture of the above two polysiloxanes, at least 30 mol percent of the polymer units present in the latter ingredient being dimethylsiloxane.

A preferred lotion of this invention consists essentially of a dispersion of (a) 100 parts by weight of a fluid organopolysiloxane consisting essentially of

units and having a viscosity of 200 to 400 cs. at 25° C.,
(b) from 80 to 120 parts of the cocondensation product of (1) from 32 to 48 parts of a hydroxyl-endblocked dimethylpolysiloxane having a viscosity of 25° C. of from 1000 cs. to 20,000 cs. and (2) from 48 to 72 parts of an organosilicon resin copolymer of $SiO_{4/2}$ units and $(CH_3)_3SiO_{1/2}$ units, the ratio of the $(CH_3)_3SiO_{1/2}$ units to $SiO_{4/2}$ units present being from 0.6/1 to 1.2/1,
(c) from 500 to 8,000 parts of a volatile, nontoxic dispersing agent, and
(d) from 0 to 100 parts of a medicament.

It is preferred for the resins used in this invention to have a molecular weight of about 1,500 to 10,000. The resin disclosed immediately above can be prepared by the method of U.S. Pat. 2,676,182.

Briefly, the resin may be prepared by merely reacting a silica hydrosol having a pH of less than 5 with an organosilicon composition composed of groups of the formula $R_nSiX_{4-n}$ and

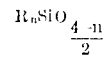

in which R is alkyl, monocyclic aryl hydrocarbon, and halogenated monocyclic aryl hydrocarbon, X is chlorine or alkoxy, and $n$ has a value from 1 to 3, the average degree of substitution of said composition being from 2.1 to 3 R groups per silicon atom and at least 50 percent of the R groups being alkyl, in amount such that there is at least one mol of organosilyl groups per mol of $SiO_2$ in the silica hydrosol. The reaction proceeds rapidly at 30° C. or above to produce copolymeric siloxanes. During the reaction the mixture is preferably thoroughly agitated. After completion of the reaction, an emulsion forms which separates into two layers upon standing. The layers are then separated and the resin noted above is washed free of acid and dried.

An excellent dispersing agent for the above lotion is a mixture of about 90 weight percent of 1,1,1-trichloroethane and 10 weight percent of isopropanol.

The compositions of this invention protect the skin from irritation by frequent washing since they are only slowly removed by soap and water.

They are usable for protecting the hands from chapping, the face from windburn or frequent washing, and the feet from the bad effects of constant contact with water or wet footgear. They are also useful for preventing diaper rash.

The preparations of this invention are vapor permeable, and despite their tenacity on the skin, they do not seriously inhibit the flow of oxygen and water vapor to and from the skin.

Other ingredients can be added to the composition of this invention, if desired, e.g. thickeners such as zinc stearate, bentonite, or silica; emulsifiers or emulsion stabilizers such as glycerol monostearate, stearic acid, a mixture of beeswax and borax, or sodium lauryl sulfate; preservatives such as methyl or propyl p-hydroxybenzoate; and other additives such as cetyl alcohol, triethanolamine, Sorbitol, 70% N.F., Allantoin, U.S.P., perfume, or coloring.

The following examples are illustrative only and should not be construed as limiting the invention, which is properly delineated in the appended claims.

EXAMPLE 1

Four parts by weight of a hydroxyl-endblocked dimethylpolysiloxane fluid having a viscosity at 25° C. of about 12,500 cs. were heated in a vacuum for 16 hours at 100° to 175° C. with 6 parts by weight of a cocondensate consisting essentially of $(SiO_{4/2})$ units and $[(CH_3)_3SiO_{1/2}]$ units, the ratio of the $[(CH_3)_3SiO_{1/2}]$ units to $(SiO_{4/2})$ units present being about 0.9/1, and having a molecular weight of about 3,000.

4 parts by weight of the resulting product were mixed with 4 parts of a trimethylsiloxane-endblocked polymer of the unit formula

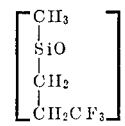

and having a viscosity at 25° C. of 300 cs., 75 parts of 1,1,1-trichloroethane, 15 parts of isopropanol, a trace of menthol, and a trace of F.D.A. approved green coloring.

The product was a clear, colored liquid which, when spread on the hands, left an invisible, water repellent film that is nonirritating to the skin, and which is not completely removed by a dozen washings with soap and water.

EXAMPLE 2

Two parts by weight of a dimethylpolysiloxane polymer having a viscosity of 60,000 cs. at 25° C. were mixed with two parts of a trimethylsiloxane-endblocked polymer of the unit formula

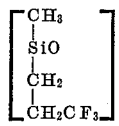

and having a viscosity at 25° C. of 300 cs., and 96 parts of 1,1,2-trichlorotrifluoroethane. The first two ingredients were incompatible with each other.

The product was a solution which, when spread on skin, leaves an invisible, water repellent film that is nonirritating to the skin. The film was not easily removed by washing with soap and water.

EXAMPLE 3

To one part by weight of the reaction product of dimethylpolysiloxane and the methylpolysiloxane resin prepared in Example 1 there was added 1 part of a compatible mixture of cyclic polysiloxane copolymers that consisted of 60 mol percent of phenylmethylsiloxane and 40 mol percent of dimethylsiloxane, having a viscosity at 25° C. of about 40 cs., and 1 part of a trimethylsiloxane-endblocked polymer of the unit formula

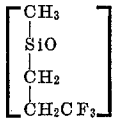

having a viscosity at 25° C. of 300 cs. This latter polymer is incompatible with dimethylpolysiloxane and the mixture of cyclic polysiloxanes used herein.

97 parts of 1,1,2 - trifluorotrichloroethane were also added to the mixture, forming a solution. This solution leaves an invisible, water repellent film that is not easily washed away when sprayed on the skin.

Improved results are obtained when only 39 parts of 1,1,2-trifluorotrichloroethane are used in the above composition.

EXAMPLE 4

Equivalent results are obtained when (a) 10 g. of a hydroxyl - endblocked 3,3,3 - trifluoropropylmethylpolysiloxane having a viscosity of 2,000 cs. at 25° C. are mixed with (b) 5 grams of ethylmethylpolysiloxane having a viscosity of 80 cs. at 25° C., which is incompatible with (a), (c) 3 grams of a hydrolyzate of the unit formula $CH_3CH_2CH_2SiO_{3/2}$, having an average molecular weight of 1,000, and 200 grams of chloroform.

EXAMPLE 5

A solution was prepared consisting of 2 weight percent of a 3,3,3-trifluoropropylmethylpolysiloxane with trimethylsiloxane endblocks having a viscosity of 300 cs. at 25° C., 2 weight percent of dimetyhlpolysiloxane having a viscosity at 25° C. of 1,000,000 cs., and 96 weight percent of 1,1,1-trichloroethane.

This solution was found to leave an invisible water repellent film that is not easily washed away when applied to the skin.

EXAMPLE 6

Each of the following formulations impart a wash-resistant, nontacky, water repellent film on the skin of the hands or the feet when applied thereto:

(I) An emulsion of
   (a) 10 parts by weight of the solvent-free mixture of silicone ingredients of Example 1,
   (b) 3 parts of glycerol monostearate,
   (c) 1 part of stearic acid,
   (d) one-half part each of beeswax and borax as an emulsifier,
   (e) 0.01 part of methyl p-hydroxybenzoate,
   (f) 80 parts of water.
(II) An emulsion of
   (a) 40 parts by weight of the solvent-free mixture of silicone ingredients of Example 1,
   (b) 15 parts of cetyl alcohol,
   (c) 1 part of sodium lauryl sulfate,
   (d) a trace of preservative,
   (e) 43 parts of water.
(III) An ointment made from
   (a) 48 parts of a trimethylsiloxane-endblocked polymer of the unit formula

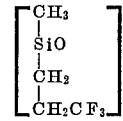

having a viscosity of 300 cs. at 25° C.,
   (b) 23 parts by weight of the reaction product of dimethylpolysiloxane and the methylpolysiloxane resin prepared in Example 1,
   (c) 23 parts of dimethylpolysiloxane having a viscosity of 100 cs. at 25° C.,
   (d) 4 parts of powdered silica thickener.

Propylene glycol can optionally be added to a formulation similar to the above to improve the "feel."

EXAMPLE 7

When 4 parts by weight of glycerol p-aminobenzoate are added to 100 parts of formulation (I) of Example 6, the product is a suntan lotion which remains on the skin for an entire day of swimming at the beach with only one application.

EXAMPLE 8

When the following ingredients are mixed, a water repellent, nontacky, antibacterial preparation for the skin is formed:

(a) 100 parts by weight of a dimethylpolysiloxane having a viscosity of 3000 cs. at 25° C.,
(b) 30 parts of dodecylmethylpolysiloxane, having a viscosity at 25° C. of 250 cs.,
(c) 20 parts of a cocondensate of 0.2 mole of

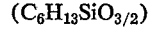

units and 0.1 mole of

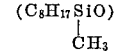

units, having an average molecular weight of 1500,
(d) 1.4 parts of Cetylpyridinium chloride, U.S.P., and
(e) 700 parts of amyl acetate.

That which is claimed is:
1. A skin composition consisting essentially of a mixture of
(a) 100 parts by weight of fluid organopolysiloxane consisting essentially of ($R_2SiO$) units, which has a viscosity of at least 20 cs. at 25° C.
(b) from 10 to 100 parts by weight of fluid organopolysiloxane consisting essentially of ($R_2SiO$) units, which has a viscosity of at least 20 cs. at 25° C. and which is incompatible with (a), in which R in (a) and (b) is selected from the group consisting of 3,3,3-trifluoropropyl, phenyl, and alkyl having from 1 to 30 carbon atoms inclusive, the viscosity at 25° C. of at least one of (a) and (b) being no more than 400 cs.
(c) from 0 to 100 parts by weight of organosilicon resin consisting essentially of

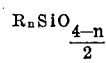

units, in which R is as defined above and $n$ has an average value of 1.0 to 1.8, a total of at least 30 parts of (b) and (c) being present, and
(d) from 0 to 100 parts by weight of a pharmaceutically effective medicament for the skin.

2. A dispersion of the skin composition of claim 1 in a volatile, nontoxic dispersing agent selected from the group consisting of water, 1,1,1-trichloroethane, trifluorotrichloroethane, isobutanol, acetone, ethyl acetate, amylacetate, cyclopentane, diethylether, chloroform and mixtures thereof.

3. The skin composition of claim 1 which contains polysiloxane that is essentially of the unit formula

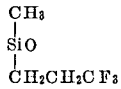

as one of the ingredients selected from the group consisting of (a) and (b).

4. The skin composition of claim 1 which contains polysiloxane that consists essentially of dimethylsiloxane units as one of the ingredients selected from the group consisting of (a) and (b).

5. The skin composition of claim 1 in which (a) is a mixture of (1) a copolymer of dimethylsiloxane and phenylmethylsiloxane units, at least 30 mol percent of the units present being dimethylsiloxane, and (2) dimethylpolysiloxane, and (b) is 3,3,3-trifluoropropylmethylpolysiloxane.

6. The skin composition of claim 1 in which at least 20 parts of ingredient (b) and 20 parts of ingredient (c) are present.

7. A lotion of claim 1 consisting essentially of a dispersion of
(a) 100 parts by weight of fluid organopolysiloxane consisting essentially of

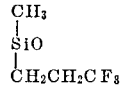

units, and having a viscosity of 200 cs. to 400 cs. at 25° C.
(b) from 80 to 120 parts by weight of the cocondensation product of (1) from 32 to 48 parts of hydroxyl-endblocked dimethylpolysiloxane having a viscosity at 25° C. of from 1,000 cs. to 20,000 cs. and
(2) from 48 to 72 parts of organosilicon resin copolymer of $SiO_{4/2}$ units and $(CH_3)_3SiO_{1/2}$ units, the ratio of the $(CH_3)_3SiO_{1/2}$ units to $SiO_{4/2}$ units present being from 0.6/1 to 1.2/1, and
(c) from 500 to 8,000 parts of a volatile, non-toxic dispersing agent selected from the group consisting of water, 1,1,1-trichloroethane, trifluorotrichloroethane, isobutanol, acetone, ethyl acetate, amylacetate, cyclopentane, diethylether, chloroform and mixtures thereof, and
(d) from 0 to 100 parts of a pharmaceutically effective medicament for the skin.

8. The lotion of claim 7 in which (c) is water.

9. The skin composition of claim 1 in which (d) is a sunscreening agent glycerol p-aminobenzoate.

10. The skin composition of claim 1 in which ingredients (a) and (b) each have a viscosity of more than 100 cs. at 25° C.

References Cited

UNITED STATES PATENTS

| | | |
|---|---|---|
| 2,643,375 | 6/1953 | Gant. |
| 2,991,301 | 7/1961 | Schmidt _____ 167—85 |
| 3,002,951 | 10/1961 | Johannson. |
| 3,035,016 | 5/1962 | Bruner. |
| 3,040,080 | 6/1962 | Kopnick et al. ____ 167—91 XR |
| 3,088,694 | 5/1963 | Ryan _____ 167—91 XR |
| 3,177,120 | 4/1965 | Black et al. _____ 167—90 |

OTHER REFERENCES

Plein et al., Journal of the American Pharmaceutical Association, February 1953, vol. XLII, No. 2, pp. 79–85.

ALBERT T. MEYERS, Primary Examiner

D. R. ORE, Assistant Examiner

U.S. Cl. X.R.

424—78, 184